United States Patent

Fredley et al.

[11] Patent Number: 5,847,787
[45] Date of Patent: Dec. 8, 1998

[54] LOW DRIVING VOLTAGE POLYMER DISPERSED LIQUID CRYSTAL DISPLAY DEVICE WITH CONDUCTIVE NANOPARTICLES

[75] Inventors: David S. Fredley, Coral Springs; Robert W. Pennisi, Boca Raton, both of Fla.

[73] Assignee: Motorola, Inc., Schaumburg, Ill.

[21] Appl. No.: 693,928

[22] Filed: Aug. 5, 1996

[51] Int. Cl.$^6$ .................................................. G02F 1/1333
[52] U.S. Cl. ................................................. 349/89; 349/86
[58] Field of Search ................... 349/86, 89, 34

[56] References Cited

U.S. PATENT DOCUMENTS 5,307,187  4/1994  Sunohara et al. ........................ 349/89
5,479,278  12/1995  Takeuchi et al. ........................ 349/89

OTHER PUBLICATIONS

Handbook of Display Technology, Castellano, "Polymer Dispersed LCDs," pp. 211–214, Academic Press, California 1992.

*Primary Examiner*—William L. Sikes
*Assistant Examiner*—Kenneth Parker
*Attorney, Agent, or Firm*—Dale W. Dorinski

[57] ABSTRACT

A reduced driving voltage polymer dispersed liquid crystal display (10) has a transparent polymer matrix (20) disposed between two substrates (12, 14). Droplets of a nematic liquid crystal fluid (22) are uniformly dispersed throughout the polymer matrix. Particles of an optically transparent material (24) that is a weak conductor are uniformly dispersed throughout the polymer matrix to reduce the electrical potential across the polymer. The enhanced conductivity of the polymer matrix allows the display to be operated at a reduced voltage.

3 Claims, 1 Drawing Sheet

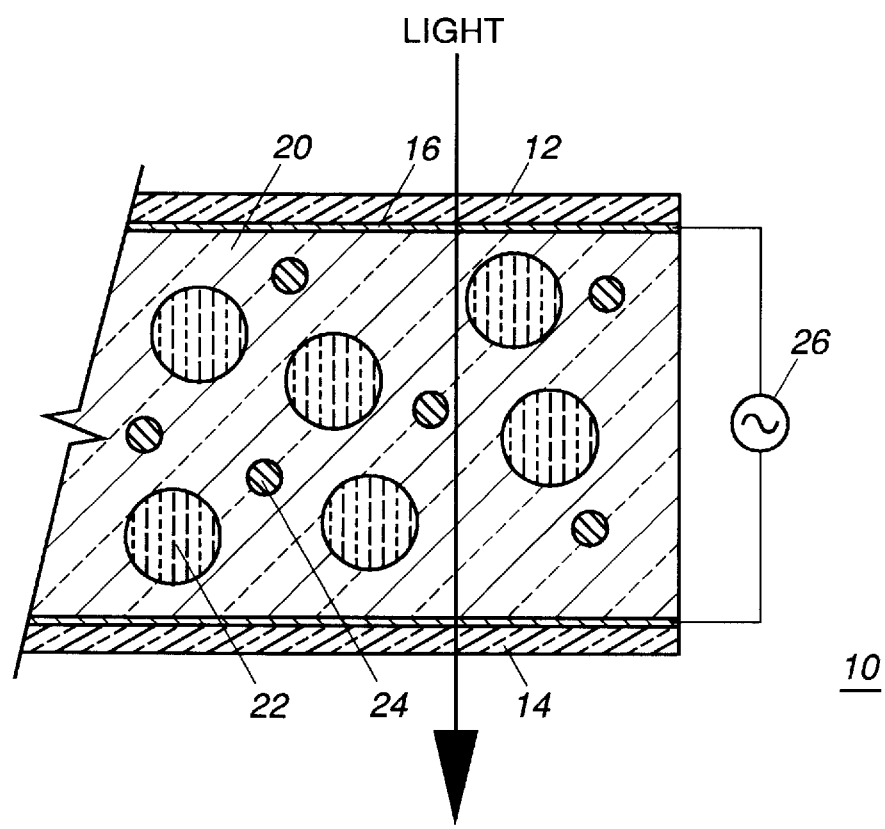

LOW DRIVING VOLTAGE POLYMER DISPERSED LIQUID CRYSTAL DISPLAY DEVICE WITH CONDUCTIVE NANOPARTICLES

TECHNICAL FIELD

This invention relates in general to liquid crystal display devices, and more particularly, to polymer dispersed liquid crystal display devices.

BACKGROUND

Polymer dispersed liquid crystal (PDLC) display devices are similar in nature to conventional liquid crystal displays. One difference between conventional displays and PDLCs is in the liquid crystal medium that is disposed between the two display substrates. In conventional displays such as twisted nematic (TN) or super twisted nematic (STN), a liquid crystal fluid is disposed between two parallel transparent substrates. When conducting elements on the substrate are electrically energized, the liquid crystal fluid aligns to transmit light. The driving voltage of conventional liquid crystal (LC) displays is typically less than 5 volts and normally between 2 and 3 volts.

In contrast, PDLCs contain a very thin layer of an electrically non-conductive polymer matrix disposed between the two substrates. Uniformly dispersed throughout this polymer matrix are microscopic droplets of nematic liquid crystal fluid. These droplets are formed by a phase separation of a homogenous solution of the polymer and the liquid crystal, or by suspending encapsulated liquid crystal fluid throughout the polymer matrix. One advantage of PDLCs is that since the liquid crystal is captured within the solid polymer matrix, the display does not have to be sealed to prevent the liquid crystal fluid from leaking. In conventional displays, an epoxy seal is placed around the perimeter of the display in order to contain the liquid crystal fluid. The elimination of this seal provides significant advantages. Another advantage is that PDLC's do not require polarizers. However, one significant disadvantage of PDLCs is that the non-conductive polymer matrix requires a relatively high driving voltage, typically in excess of 20–30 volts. This high driving voltage limits the application of PDLCs to those products that have a power supply to enable this high driving voltage.

It would be a significant contribution to the art if a liquid crystal display could be created that provides the low driving voltage of conventional displays with the advantages of PDLCs.

BRIEF DESCRIPTION OF THE DRAWINGS

The drawing FIGURE is a cross sectional schematic representation of an improved PDLC in accordance with the invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing FIGURES. The relative sizes of some of the various elements has been intentionally exaggerated for clarity.

Referring now to the sole drawing FIGURE, a PDLC display 10 consists of two parallel transparent substrates 12 and 14. The substrates are arranged to be substantially parallel to each other and each contain a conductive element 16 formed on the surface. The conductive element is typically a material such as indium-tin oxide (ITO). The ITO film is typically patterned in a desired configuration in order to represent a letter or icon that is to be illuminated on the display. The substrates are arranged so that the ITO film on one substrate faces the ITO film on the opposing substrate. Spacers are used to maintain a uniform gap between each of the transparent substrates 12 and 14. The spacers are typically uniformly dispersed across the surface of the substrate or, in other situations, may simply be located around the perimeters of the substrate.

A polymer matrix 20, typically made from an electrically insulative transparent polymer, is situated in the gap between the two transparent substrates. The polymer matrix 20 contains small spheres or droplets 22 of a liquid crystal fluid uniformly dispersed throughout the polymer matrix. This is typically performed by dissolving the LC fluid in the polymer matrix when the polymer is in a liquid form to create a homogeneous solution. The liquid crystal polymer is then cooled in a controlled manner so that a uniform phase separation of the liquid crystal material and a dispersion of liquid crystal droplets through the solid polymer matrix. An alternative method well known in the art, is to microencapsulate the liquid crystal fluid and then uniformly distribute the microencapsulated fluid throughout the polymer matrix. In either situation, the end result is a very thin layer of transparent polymer 20 containing uniformly dispersed droplets of liquid crystal fluid. The polymer matrix layer in PDLCs is typically much thinner than the layer of liquid crystal fluid used in conventional displays. Because the polymer material itself is electrically non-conductive, a relatively high driving voltage typically 20–30 volts must be applied to the conductive elements 16 on each of the transparent substrates 12 and 14 in order to activate the liquid crystal fluid droplets. In the off state, when no electrical field is applied, the optical axis of the liquid crystal (LC) fluid is random and the droplets scatter the light that strikes the display. When voltage is applied to switch the PDLC to the on state, the applied field energizes the liquid crystals and aligns them with the field, thus allowing light to pass through the PDLC unobstructed. The PDLC appears to be opaque in the off state because the ordinary index of refraction of the liquid crystal molecules is dissimilar to that of the polymer matrix, scattering any incident light. In the on state, when the electrical field is applied, the index of refraction of the LC fluid matches the index of refraction of the polymer matrix, thus the droplets of the LC fluid do not scatter light and the display appears to be clear.

In order to reduce the driving voltage of a conventional PDLC, a partially conductive material 24 is added to the polymer matrix. The requirements for such a conductive material are that the particle size should be very small so that the cell gap is not disturbed, and it should be optically transparent (or nearly so), i.e. the skin depth should be such that no reflection or absorption of incident light takes place. Therefore, to avoid complete reflection of the incident light, a material which is a weak or partial electrical conductor is the most practical type of material to use. One candidate material is ITO, which, when properly formed, does not absorb or reflect an appreciable amount of visible light, and has the required amount of electrical conductivity. Particles of ITO around 0.1 micron in diameter will typically transmit greater than 85% of the light. When the external electrical field 26 is switched to the on state, the ITO particles that are dispersed throughout the polymer matrix reduce the voltage drop across the two conductive elements 16. By carefully controlling the amount of ITO in the matrix, the field is only partially weakened. If an excess of the electrically conductive material 24 is added, the polymer matrix will become totally conducting and, the PDLC will not function properly. Optionally, a thin insulated barrier, such as silicon dioxide ($SiO_2$), on the top and bottom substrates will prevent a shorting from occurring between the two substrates. The particles 24 are randomly distributed or dispersed throughout the polymer matrix 20 and the droplets of LC fluid 22.

One method of uniformly dispersing the particles 24 throughout the polymer matrix 20 is to create a nanoparticle dispersion with the polymers embedded into the polymer matrix. Nanoparticle dispersions have found recent applications in magnetic or optical storage mediums. Nanoparticle technology has been studied by, amongst others, the University of Florida, Department of Material Science and Engineering, Gainesville, Fla. A variety of materials can be used to form nanoparticles, such as metals, metal oxides and conducting polymers. Especially useful are indium-tin oxide, chrome oxides and polyethylene oxides. Typically, the level of the particles used within the PDLC varies between about 1% and about 30% by weight. The exact amount of the nanoparticle to be used in each particular application is a function of the compound used and the polymer matrix. Obviously, the level of particles to be added must be enough in order to reduce the driving voltage to a desired level, however, excess amounts of conducting material will cause the PDLC to malfunction. When properly done, the driving voltage of a PDLC in accordance with the invention, is less than 15 volts and can be as low as 2–3 volts, the threshold of conventional liquid crystal displays. Typically, a driving voltage of 5–10 volts is experienced.

In summary, a PDLC having a low driving voltage and high optical contrast has been created, using particles that are weak electrical conductors as a dopant in the polymer matrix. These particles reduce the electrical potential across the insulative polymer matrix, allowing the dispersed liquid crystal droplets to become aligned at a much lower applied voltage.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A reduced driving voltage polymer dispersed liquid crystal display device, comprising:

a liquid crystal display cell having a polymer matrix disposed between two substrates;

droplets of liquid crystal fluid uniformly dispersed throughout the polymer matrix; and nanoparticles of an optically transparent electrically conductive material uniformly dispersed throughout the polymer matrix.

2. A polymer dispersed liquid crystal display device having reduced driving voltage and improved contrast, comprising:

a liquid crystal display cell having two transparent substrates, each substrate having a thin layer of an optically transparent conductive material patterned on a major surface, and the substrates arranged parallel to each other so that a gap is formed between them;

a non-conductive polymer having droplets of a liquid crystal fluid and nanoparticles of optically transparent indium-tin oxide uniformly dispersed throughout the polymer;

the non-conductive polymer disposed in the gap between the substrates and contacting the thin layer of optically transparent conductive material; and wherein the driving voltage of the device is less than 15 volts.

3. The reduced driving voltage polymer dispersed liquid crystal display device as described in claim 2, wherein the polymer contains between about 1% and about 30% by weight of the nanoparticles.

* * * * *